(12) United States Patent
Shibayama

(10) Patent No.: US 9,519,457 B2
(45) Date of Patent: Dec. 13, 2016

(54) ARITHMETIC PROCESSING APPARATUS AND AN ARITHMETIC PROCESSING METHOD

(75) Inventor: Atsufumi Shibayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 364 days.

(21) Appl. No.: 14/118,108

(22) PCT Filed: Aug. 31, 2011

(86) PCT No.: PCT/JP2011/070306
§ 371 (c)(1),
(2), (4) Date: Nov. 15, 2013

(87) PCT Pub. No.: WO2012/157132
PCT Pub. Date: Nov. 22, 2012

(65) Prior Publication Data
US 2014/0089361 A1 Mar. 27, 2014

(30) Foreign Application Priority Data
May 16, 2011 (JP) ................... 2011-109554

(51) Int. Cl.
*G06F 7/48* (2006.01)
*G06F 7/483* (2006.01)
*G06F 7/499* (2006.01)

(52) U.S. Cl.
CPC ................. *G06F 7/48* (2013.01); *G06F 7/483* (2013.01); *G06F 7/49942* (2013.01)

(58) Field of Classification Search
CPC ................................ G06F 7/383; G06F 7/485
See application file for complete search history.

(56) References Cited

U.S. PATENT DOCUMENTS

| 4,872,132 A * | 10/1989 | Retter | G06F 5/01 |
| | | | 708/404 |
| 6,728,739 B1 * | 4/2004 | Kobayashi | G06F 7/483 |
| | | | 708/208 |
| 2009/0292750 A1 * | 11/2009 | Reyzin | G06F 7/483 |
| | | | 708/209 |

FOREIGN PATENT DOCUMENTS

| JP | H4-195334 A | 7/1992 |
| JP | H8-212052 A | 8/1996 |

(Continued)

OTHER PUBLICATIONS

International Search Report for PCT Application No. PCT/JP2011/070306, mailed on Oct. 25, 2011.

*Primary Examiner* — Chuong D Ngo

(57) ABSTRACT

Provided is an arithmetic processing apparatus and an arithmetic processing method which can perform block floating point processing with small circuit scale and high precision. A first normalization circuit (120) performs a first normalization, in which a plurality of pieces of data, which have a common exponent and which are either fixed-point number representation data or mantissa portion data of block floating-point number representation, are inputted in each of a plurality of cycles and the plurality of pieces of data inputted in each of the plurality of cycles are respectively normalized with the common exponent on the basis of a maximum exponent for the plurality of pieces of data inputted in a corresponding one of the plurality of cycle. A rounding circuit (130) outputs a plurality of pieces of rounded data which are obtained by reducing a bit width of respective one of the plurality of pieces of data on which the first normalization is performed. A first storage circuit (140) stores a plurality of pieces of rounded data regarding the plurality of cycles in which the first normalization is performed and outputs a plurality of designated pieces of rounded data among the stored plurality of pieces of rounded data. A second normalization circuit (150) performs a second normalization, in which the plurality of designated pieces of rounded data are respectively normalized with an exponent which is common to the plurality of designated pieces of rounded data on the basis of the maximum exponents used in the first normalization for the plurality of designated pieces of rounded data and a maximum value of the maximum exponents, and outputs a result of the second normalization.

7 Claims, 7 Drawing Sheets

(56) References Cited

FOREIGN PATENT DOCUMENTS

JP         H9-128213 A     5/1997
WO      99/66423 A1    12/1999

* cited by examiner

ARITHMETIC PROCESSING APPARATUS AND AN ARITHMETIC PROCESSING METHOD

This application is a National Stage Entry of PCT/JP2011/070306 filed on Aug. 31, 2011, which claims priority from Japanese Patent Application 2011-109554 filed on May 16, 2011, the contents of all of which are incorporated herein by reference, in their entirety.

TECHNICAL FIELD

The present invention relates to an arithmetic processing apparatus and an arithmetic processing method and in particular, relates to an arithmetic processing apparatus and an arithmetic processing method which perform block floating point processing.

BACKGROUND ART

In the digital signal processing, calculation based on a floating point has an advantage that a high precision can be obtained even when a range of values of signal data dealt with is wide. On the other hand, it has a problem that circuit scale and electric power consumption are large since it needs complicated circuits. Calculation based on a fixed point has an advantage that a circuit is simple, and circuit scale and electric power consumption are small. On the other hand, it has a problem that an arithmetic calculation precision is low.

In contrast, as an arithmetic method having advantages of both the fixed point and the floating point, calculation based on a block floating point is known. In the calculation based on the block floating point, a plurality pieces of signal data are bundled as one block, the whole block is normalized in such a way that each block has a common exponent.

More in detail, in the block floating point processing, the normalization processing of a block floating point is performed in the following steps (patent literature 1 and patent literature 2, for example).

(1) Obtain the maximum exponent for all pieces of data in a block (2) Carry out shift operation (normalize) for the whole of the block with the maximum exponent.

Here, "maximum exponent" indicates the maximum exponent which does not cause an overflow for any piece of data in the block. The maximum exponent is equivalent to an exponent value of a piece of data whose absolute value is maximum among all pieces of data in the block.

CITATION LIST

Patent Literature

[Patent literature 1] Japanese Patent Application Laid-Open No. H09-128213
[Patent literature 2] Japanese Patent Application Laid-Open No. H08-212052

SUMMARY OF INVENTION

Technical Problem

A specific example of normalization processing of a usual block floating point will be described below. FIG. 5 is a block diagram showing a configuration of a usual arithmetic processing apparatus 200 which performs normalization processing of a block floating point. The arithmetic processing apparatus 200 includes a first arithmetic circuit 201, a normalization circuit 202, a data memory circuit 203, rounding circuits 241-243 and a second arithmetic circuit 204.

The first arithmetic circuit 201 carries out an arithmetic operation to received three pieces of input data, and outputs arithmetic operation results as data D211-D213, respectively. The different pieces of input data included in one block are inputted to the first arithmetic circuit 201 in order. For example, in FIG. 5, the first arithmetic circuit 201 receives nine pieces of input data composing a block. In this case, the first arithmetic circuit 201 receives three pieces of input data per each of three cycles. The first arithmetic circuit 201 carries out an arithmetic operation to the received pieces of input data, and outputs data D211-D213 which are the arithmetic operation results in each of three cycles. The pieces of input data are outputted from an external apparatus (not shown) to the first arithmetic circuit 201 in order.

A normalization circuit 202 has a maximum exponent calculation circuit 210 and shift circuits 221-223. The maximum exponent calculation circuit 210 receives data D211-D213 composing the block outputted from the first arithmetic circuit 201 in order, and calculates the maximum exponent Imax for the data D211-D213 belonging to the block. That is, each time a block is received from the first arithmetic circuit 201, the calculation operation of the maximum exponent Imax is performed. Then the maximum exponent calculation circuit 210 outputs the calculated maximum exponent Imax.

While the maximum exponent calculation circuit 210 is receiving the data D211-D213 from the first arithmetic circuit 201 and calculating the maximum exponent Imax for the data D211-D213 belonging to a block, the data memory circuit 203 holds the data D211-D213 belonging to the same block. That is, the data memory circuit 203 holds the data D211-D213 by each block. Specifically, the data memory circuit 203 stores and holds the data D211-D213 in addresses corresponding to write addresses Aw21-Aw23 which are received from the outside, respectively.

After the maximum exponent Imax is calculated by the maximum exponent calculation circuit 210, the data memory circuit 203 outputs the held data D211-D213 as data D221-D223. At that time, the output data memory circuit 203 may rearrange order of the data D211-D213 and output them as the data D221-D223. Specifically, the data memory circuit 203 outputs data held in addresses corresponding to readout addresses Ar21-Ar23 which are received from the outside as the data D221-D223, respectively.

The write addresses Aw21-Aw23 and the readout addresses Ar21-Ar23 inputted to the data memory circuit 203 are outputted from an external apparatus (not shown) to the data memory circuit 203 in order, for example.

Shift circuits 221-223 of the normalization circuit 202 receive the data D221-D223 from the data memory circuit 203. The shift circuits 221-223 carry out shift operation on the D221-D223, respectively, based on the maximum exponent Imax calculated by the maximum exponent calculation circuit 210. As a result, the normalization processing is performed for the data D221-D223. The shift circuits 221-223 output the data after the normalization processing as data D231-D233.

Rounding circuits 241-243 receives the data D231-D233 from the shift circuits 221-223, respectively. The rounding circuits 241-243 performs the rounding processing to the data D231-D233, respectively, and outputs data D241-D243 whose data bit width is reduced.

The second arithmetic circuit 204 receives the data D241-D243 from the rounding circuits 241-243. The second arithmetic circuit 204 carries out an arithmetic operation to the data D241-D243, and outputs arithmetic operation results to an external apparatus (not shown) as output data.

In this way, because the arithmetic processing apparatus 200 reduces a bit width of data by the rounding processing by the rounding circuits 241-243, the bit width of the data D241-D243 received by the second arithmetic circuit can be smaller than bit width of the data D211-D213 outputted by the first arithmetic circuit 201.

Next, operation of the arithmetic processing apparatus 200 will be explained in detail. FIG. 6 is a timing chart showing the operation of the arithmetic processing apparatus 200. In below, a block to be processed by the arithmetic processing apparatus 200 includes data D1-D9 each having 12 bits. A value of each of the data D1-D9 is represented with two's complement representation. Note that, in a bit string of data, the leftmost bit is MSB (Most Significant Bit), and the rightmost bit is LSB (Least Significant Bit). The MSB is a sign bit. The operation of the arithmetic processing apparatus 200 includes cycles C1-C6. The operation of the arithmetic processing apparatus 200 is broadly divided into cycles C1-C3 and cycles C4-C6. In below, the cycles C1-C3 will be described, first. The progress of the cycles is controlled using a clock signal CLK, for example.

In the cycle C1, the first arithmetic circuit 201 carries out an arithmetic operation for three inputted pieces of data, and outputs the results as data D211-D213, respectively. The data D211-D213 outputted at that time are represented as data D1-D3, respectively. In the cycle C2, the first arithmetic circuit 201 carries out the arithmetic operation for three inputted pieces of data, and outputs the results as the data D211-D213, respectively. The data D211-D213 outputted at that time are represented as data D4-D6, respectively. In a cycle C3, the first arithmetic circuit 201 carries out the arithmetic operation for three inputted pieces of data, and outputs the results as data D211-D213, respectively. The data D211-D213 outputted at that time are represented as data D7-D9, respectively. The data D1-D9 are shown below.

Data D1 (cycle C1, data D211): 000101110111
Data D2 (cycle C1, data D212): 001100010001
Data D3 (cycle C1, data D213): 000001101100
Data D4 (cycle C2, data D211): 111100111000
Data D5 (cycle C2, data D212): 111110000000
Data D6 (cycle C2, data D213): 000000100101
Data D7 (cycle C3, data D211): 000010111110
Data D8 (cycle C3, data D212): 000011010001
Data D9 (cycle C3, data D213): 000010111001

The maximum exponent calculation circuit 210 receives the data D1-D9 composing a block, sequentially. The maximum exponent calculation circuit 210 calculates a maximum exponent for the data D1-D9. Specifically, the maximum exponent calculation circuit 210 calculates absolute values of the data D1-D9, respectively. The respective absolute values ABS1-ABS9 of the data D1-D9 are shown below.

Absolute value ABS1 (absolute value of data D1): 000101110111
Absolute value ABS2 (absolute value of data D2): 001100010001
Absolute value ABS3 (absolute value of data D3): 000001101100
Absolute value ABS4 (absolute value of data D4): 000011001000
Absolute value ABS5 (absolute value of data D5): 000010000000
Absolute value ABS6 (absolute value of data D6): 000000100101
Absolute value ABS7 (absolute value of data D7): 000010111110
Absolute value ABS8 (absolute value of data D8): 000011010001
Absolute value ABS9 (absolute value of data D9): 000010111001

The maximum exponent calculation circuit 210 calculates a logical sum ADD of the absolute values ABS1-ABS9. The logical sum of the absolute value ABS1-ABS9 is shown below.

The logical sum ADD (logical sum of absolute values ABS1-ABS9): 001111111111.

The maximum exponent calculation circuit 210 detects the first bit position indicating one as a value of the bit from the MSB (Most Significant Bit) side of the logical sum ADD. In this example, the 9-th bit is detected as the first bit position indicating one as the value of the bit from the MSB side of the logical sum ADD (here, it is assumed that the MSB is 11-th bit and, the LSB (Least Significant Bit) is 0-th bit).

Here, the case that bit shift operation of shifting left is carried out on each of the data D1-D9 with a same shift size to normalize the data D1-D9 with a common exponent is considered. In this case, when the shift size is 1 bit, values after the normalization are correctly represented without changing a sign of any of the data D1-D9. Accordingly, in this case, the maximum exponent Imax is "−1".

In the cycles C1-C3, that is, while the maximum exponent calculation circuit 210 is calculating the maximum exponent Imax for the data D1-D9, the data memory circuit 203 receives and holds the data D1-D9. In the cycles C4-C6 after the maximum exponent Imax is calculated by the maximum exponent calculation circuit 210, the data memory circuit 203 outputs the held data D1-D9 as data D221-D223. At that time, the data memory circuit 203 outputs the data D221-D223 as follows, for example, for the arithmetic operation carried out by the second arithmetic circuit 204.

In the cycle C1, the data memory circuit 203 stores the data D1-D3 in addresses A1-A3 designated by write addresses Aw21-Aw23, respectively. In the cycle C2, the data memory circuit 203 stores the data D4-D6 in addresses A4-A6 designated by write addresses Aw21-Aw23, respectively. In the cycle C3, the data memory circuit 203 stores the data D7-D9 in addresses A7-A9 designated by write addresses Aw21-Aw23, respectively.

Next, the cycles C4-C6 will be described. In the cycles C4-C6, the maximum exponent calculation circuit 210 outputs "−1" as the calculated maximum exponent Imax, to the shift circuits 221-223.

In the cycle C4, the data memory circuit 203 outputs the held data D1 in the address A1 designated by readout address Ar21 as the data D221. The data memory circuit 203 outputs the held data D3 in the address A3 designated by readout address Ar22 as the data D222. The data memory circuit 203 outputs the held data D5 in the address A5 designated by readout address Ar23 as the data D223.

In the cycle C5, the data memory circuit 203 outputs the held data D2 in the address A2 designated by the readout address Ar21 as the data D221. The data memory circuit 203 outputs the held data D4 in the address A4 designated by the readout address Ar22 as the data D222. The data memory circuit 203 outputs the held data D7 in the address A7 designated by the readout address Ar23 as the data D223.

In the cycle C6, the data memory circuit 203 outputs the data D6 held in the address A6 designated by the readout address Ar21 as the data D221. The data memory circuit 203 outputs the data D8 held in the address A8 designated by the readout address Ar22 as the data D222. The data memory circuit 203 outputs the data D9 held in the address A9 designated by the readout address Ar23 as the data D223.

The respective shift circuits 221-223 performs the normalization processing by carrying out shift operation on the data D1-D9 outputted as the data D221-D223 based on the value "−1" of the maximum exponent Imax. The shift circuits 221-223 output the generated normalized data ND1-ND9 from the data D1-D9 by the normalization processing.

Specifically, in the cycle C4, the respective shift circuits 221-223 carry out shift operation on the data D1, D3 and D5 outputted as the data D221-D223, based on the value "−1" of the maximum exponent Imax. As a result, the normalized data ND1, ND3 and ND5 are generated. The normalized data ND1, ND3 and ND5 are outputted as data D231-D233, respectively.

In the cycle C5, the respective shift circuits 221-223 carry out shift operation on the data D2, D4 and D7 outputted as the data D221-D223, based on the value "−1" of the maximum exponent Imax. As a result, the normalized data ND2, ND4 and ND7 are generated. The normalized data ND2, ND4 and ND7 are outputted as the data D231-D233, respectively.

In the cycle C6, the respective shift circuits 221-223 carry out shift operation on the data D6, D8 and D9 outputted as the data D221-D223, based on the value "−1" of the maximum exponent Imax. As a result, the normalized data ND6, ND8 and ND9 are generated. The normalized data ND6, ND8 and ND9 are outputted as the data D231-D233, respectively.

The normalized data ND1-ND9 are shown below.
(Cycle C4)
Normalized data ND1: 001011101110
Normalized data ND3: 000011011000
Normalized data ND5: 111100000000
(Cycle C5)
Normalized data ND2: 011000100010
Normalized data ND4: 111001110000
Normalized data ND7: 000101111100
(Cycle C6)
Normalized data ND6: 000001001010
Normalized data ND8: 000110100010
Normalized data ND9: 000101110010

In the cycles C4-C6, the respective rounding circuits 241-243 perform the rounding processing to the normalized data ND1-ND9 outputted as the data D241-D243. As a result, rounded data RD1-RD9 each having a bit width of six bits, reduced from the normalized data ND1-ND9, are generated.

Specifically, in the cycle C4, the rounding circuits 241-243 round the normalized data ND1, ND3 and ND5 outputted as the data D231-D233 and generate the rounded data RD1, RD3 and RD5, respectively. The rounded data RD1, RD3 and RD5 are outputted as data D241-D243, respectively.

In the cycle C5, the rounding circuits 241-243 round the normalized data ND2, ND4 and ND7 outputted as the data D231-D233 and generate the rounded data RD2, RD4 and RD7, respectively. The rounded data RD2, RD4 and RD7 are outputted as the data D241-D243, respectively.

In the cycle C6, the rounding circuits 241-243 round the normalized data ND6, ND8 and ND9 outputted as the data D231-D233 and generate the rounded data RD6, RD8 and RD9, respectively. The rounded data RD6, RD8 and RD9 are outputted as the data D241-D243, respectively.

The rounded data RD1-RD9 are shown below.
(Cycle C4)
Rounded data RD1: 001011
Rounded data RD3: 000011
Rounded data RD5: 111100
(Cycle C5)
Rounded data RD2: 011000
Rounded data RD4: 111001
Rounded data RD7: 000101
(Cycle C6)
Rounded data RD6: 000001
Rounded data RD8: 000110
Rounded data RD9: 000101

The second arithmetic circuit 204 carries out the arithmetic operation to the data D241-D243 outputted by the shift circuits 221-223, and outputs the results, respectively.

Specifically, in the cycle C4, the second arithmetic circuit 204 carries out the arithmetic operation to the rounded data RD1, RD3 and RD5 and outputs the results, respectively. In the cycle C5, the second arithmetic circuit 204 carries out the arithmetic operation to the rounded data RD2, RD4 and RD7 and outputs the results, respectively. In the cycle C6, the second arithmetic circuit 204 carries out the arithmetic operation to the rounded data RD6, RD8 and RD9 and outputs the results, respectively.

As mentioned above, the normalization circuit 202 performs the normalization processing before the rounding circuits 241-243 perform the round processing in the arithmetic processing apparatus 200. Therefore, it is possible to reduce a bit width by the round processing while keeping effective bits which are not redundant. Accordingly, it is possible to obtain higher precision of the arithmetic operation compared with the case that the round processing is performed to a fixed point data.

In the arithmetic processing apparatus 200, rounding circuits 241-243 reduces the bit width of the data by performing the round processing. Therefore, the bit width of the data received by the second arithmetic circuit 204 can be smaller than the bit width of the data outputted by the first arithmetic circuit 201. That is, the bit width of the data to which the second arithmetic circuit 204 carry out arithmetic operation can be reduced. Accordingly, circuit scale and electric power consumption of the second arithmetic circuit 204 can be reduced.

However, in the arithmetic processing apparatus 200, in order to calculate the maximum exponent, it is necessary to hold the all pieces of data in a block before the normalization processing and the round processing in the data memory circuit 203. Therefore, the required memory capacity for the data memory circuit 203 becomes large. As a result, there is a problem that the circuit scale becomes large.

In addition, in the arithmetic processing apparatus 200, all pieces of data in the block are normalized with a common exponent. Therefore, when the number of pieces of data in the data processing becomes large, there is a problem that the precision is reduced in the case that a range (a dynamic range) regarding a value of each piece of data is wide.

The present invention has been devised with the foregoing in mind. An object of the present invention is to provide an arithmetic processing apparatus and an arithmetic processing method with small circuit scale that can perform block floating point processing with high precision.

Solution to Problem

An arithmetic processing apparatus according to an exemplary aspect of the invention includes: a first normalization means for performing a first normalization, in which a plurality pieces of data, which have a common exponent and which are either fixed-point number representation data or mantissa portion data of block floating-point number representation, are inputted in each of a plurality of cycles and the plurality of pieces of data inputted in each of the plurality of cycles are respectively normalized with the common exponent on the basis of a maximum exponent for the plurality of pieces of data inputted in a corresponding one of the plurality of cycle; a rounding means for outputting a plurality of pieces of rounded data which are obtained by reducing a bit width of respective one of the plurality of pieces of data on which the first normalization is performed; a first storage means for storing a plurality of pieces of rounded data regarding the plurality of cycles in which the first normalization is performed and outputting a plurality of designated pieces of rounded data among the stored plurality of pieces of rounded data; and a second normalization means for performing a second normalization, in which the plurality of designated pieces of rounded data are respectively normalized with an exponent which is common to the plurality of designated pieces of rounded data on the basis of the maximum exponents used in the first normalization for the plurality of designated pieces of rounded data and a maximum value of the maximum exponents, and outputting a result of the second normalization.

An arithmetic processing method according to an exemplary aspect of the invention includes: performing a first normalization, in which a plurality pieces of data, which have a common exponent and which are either fixed-point number representation data or a mantissa portion data of block floating-point number representation, are inputted in each of a plurality of cycles and the plurality of pieces of data inputted in each of the plurality of cycles are respectively normalized with the common exponent on the basis of a maximum exponent for the plurality of pieces of data inputted in a corresponding one of the plurality of cycle; outputting a plurality of pieces of rounded data which are obtained by reducing a bit width of respective one of the plurality of pieces of data on which the first normalization is performed; storing a plurality of pieces of rounded data regarding the plurality of cycles in which the first normalization is performed and outputting a plurality of designated pieces of rounded data among the stored plurality of pieces of rounded data; and performing a second normalization, in which the plurality of designated pieces of rounded data are respectively normalized with an exponent which is common to the plurality of designated pieces of rounded data on the basis of the maximum exponents used in the first normalization for the plurality of designated pieces of rounded data and a maximum value of the maximum exponents, and outputting a result of the second normalization.

Advantageous Effect of Invention

According to the present invention, it is possible to provide an arithmetic processing apparatus and an arithmetic processing method which can perform block floating point processing with small circuit scale and high precision.

DESCRIPTION OF EMBODIMENTS

Hereinafter, an embodiment of the present invention will be described with reference to drawings. In each figure, an identical reference sign is used for an identical element and duplicated description is omitted where appropriate.

Exemplary Embodiment 1

Figure 1:
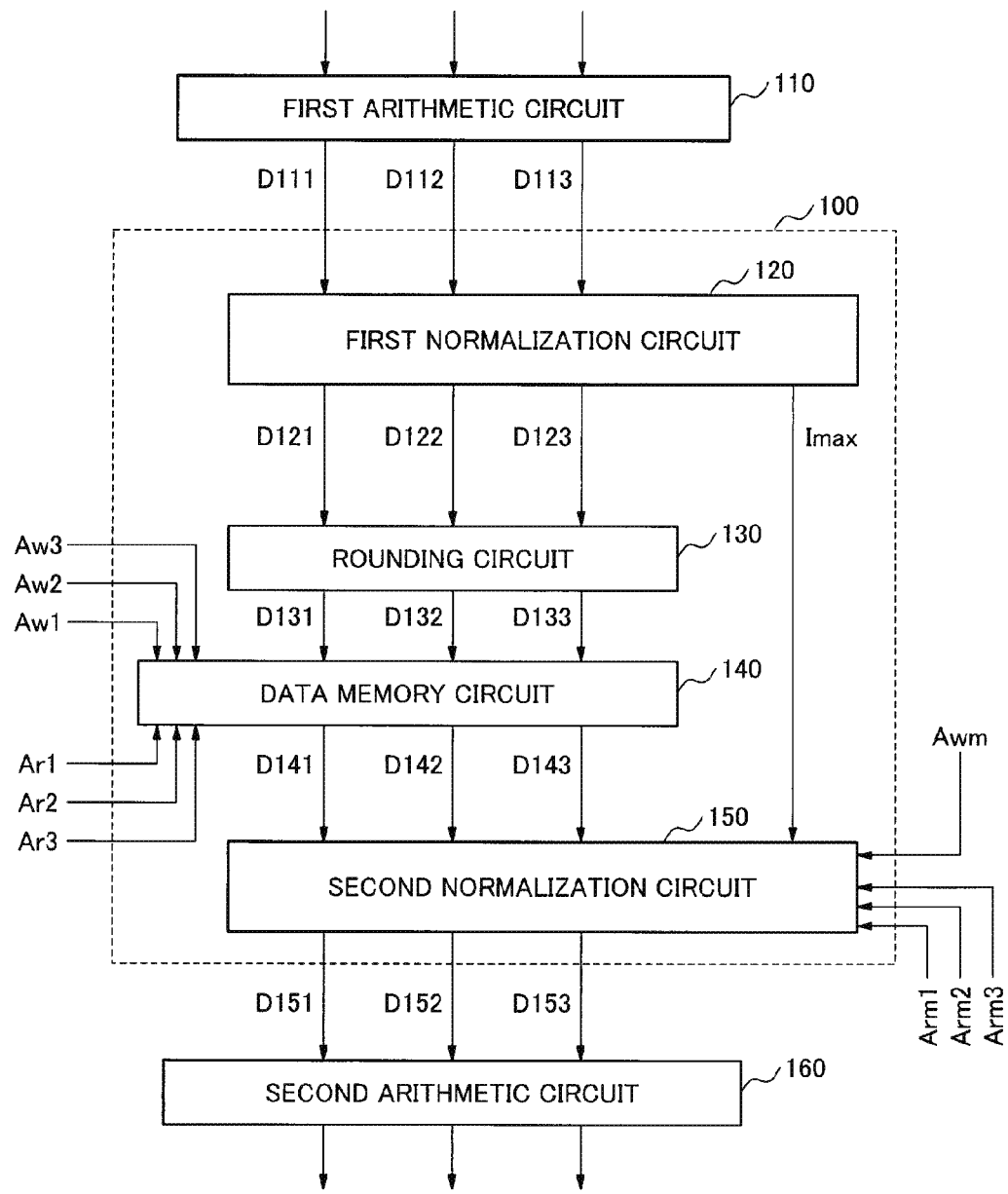
FIG. 1 is a block diagram which showing a configuration of a arithmetic processing apparatus 100 according to an exemplary embodiment 1.

First, an arithmetic processing apparatus 100 according to an exemplary embodiment 1 of the present invention will be described. FIG. 1 is a block diagram showing a configuration of an arithmetic processing apparatus 100 according to the exemplary embodiment 1. The arithmetic processing apparatus 100 includes a first normalization circuit 120, a rounding circuit 130, a data memory circuit 140 and a second normalization circuit 150. Note that, the first normalization circuit 120 and the second normalization circuit 150 correspond to a first and a second normalization means, respectively. The rounding circuit 130 corresponds to a rounding means. The data memory circuit 140 corresponds to a first storage means.

A plurality of pieces of fixed point number representation data or mantissa part data of block floating point number representation composing a block is inputted to the arithmetic processing apparatus 100, a plurality of times, via the first arithmetic circuit 110. In other words, n (n is an integer which is equal to or greater than 2) pieces of data per each cycle are inputted during m (m is an integer which is equal to or greater than 2) cycles to the arithmetic processing apparatus 100. In this case, the number of pieces of data composing one block is (m×n) pieces.

In below, for simplification of the description, the case where three pieces of data are inputted three cycles to the arithmetic processing apparatus 100 will be described. In this case, each three of different pieces of input data included in one block are inputted to the first arithmetic circuit 110, in order. The first arithmetic circuit 110 carries out an arithmetic operation to the received three pieces of input data, and outputs the arithmetic operation results as data D111-D113, respectively. The pieces of input data are outputted from an external apparatus (not shown) to the first arithmetic circuit 110, for example, in order. For example, in FIG. 1, the first arithmetic circuit 110 receives nine pieces of input data composing a block. In this case, the first arithmetic circuit 110 receives three pieces of input data per each of three cycles. The first arithmetic circuit 110 carries out the arithmetic operation to the received pieces of input data, and outputs the data D111-D113 which are the arithmetic operation results, three cycles.

The arithmetic processing apparatus 100 performs predetermined processing to the inputted pieces of data included in the block and outputs data D151-153 after the processing to the second arithmetic circuit 160. The second arithmetic circuit 160 carries out an arithmetic operation to the data D151-D153, and outputs arithmetic operation results to an external apparatus (not shown).

Figure 2:
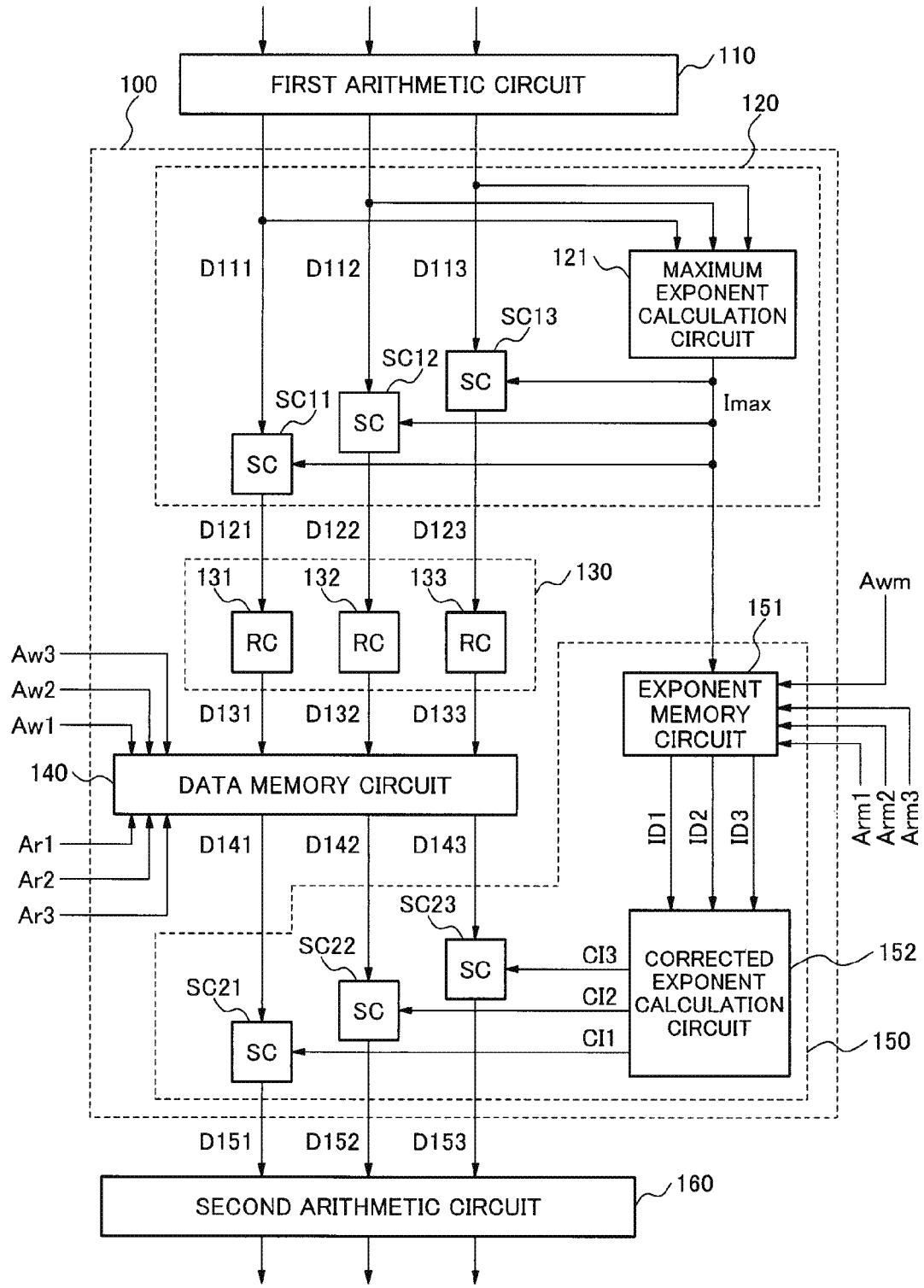
FIG. 2 is a block diagram showing the configuration of the arithmetic processing apparatus 100 according to the exemplary embodiment 1 more in detail.

FIG. 2 is a figure showing the configuration of the arithmetic processing apparatus 100 more in detail. As shown in FIG. 2, the first normalization circuit 120 includes shift circuits SC11-SC13 and a maximum exponent calculation circuit 121. In FIG. 1, for simplification, "shift circuit" is represented with "SC". Note that, the shift circuits SC11-SC13 correspond to second shifting means, respectively. The maximum exponent calculation circuit 121 corresponds to a second calculation circuit.

The maximum exponent calculation circuit 121 receives the data D111-D113 and calculates the maximum exponent Imax for the data D111-D113 in each cycle. The maximum exponent calculation circuit 121 outputs the calculated maximum exponent Imax in each cycle.

The shift circuits SC11-SC13 perform a first normalization processing by shifting bits of the data D111-D113 based on the maximum exponent Imax calculated by the maximum exponent calculation circuit 121, in each cycle. Data D121-D123 for which the first normalization processing has been performed are outputted to rounding circuits 131-133, respectively. In FIG. 1, for simplification, "rounding circuit" is represented with "RC".

The rounding circuit 130 includes the rounding circuits 131-133. Note that, the rounding circuits 131-133 correspond to first to third rounding means, respectively. The rounding circuits 131-133 generate rounded data D131-D133 by performing rounding processing, which reduces a bit width, to the data D121-D123. The rounded data D131-D133 are outputted to a data memory circuit 140.

The data memory circuit 140 holds the rounded data D131-D133 by each block. That is, the data memory circuit 140 holds the data D131-D133 by each block. Specifically, the data memory circuit 140 stores and holds the data D131-D133 in the addresses corresponding to write addresses Aw1-Aw3 which are received from the outside.

The data memory circuit 140 outputs the held data of each block as data D141-D143. At that time, the data memory circuit 140 may rearrange order of the data D131-D133 and output them as data D141-D143. Specifically, the data memory circuit 203 outputs the data held in the addresses corresponding to readout addresses Ar1-Ar3 which are received from the outside as the data D141-D143, respectively.

The write addresses Aw1-Aw3 and the readout addresses Ar1-Ar3 received by the data memory circuit 140 are outputted from an external apparatus (not shown) to the data memory circuit 140 in order, for example.

The second normalization circuit 150 includes an exponent memory circuit 151, a corrected exponent calculation circuit 152 and shift circuits SC21-SC23. Note that, the exponent memory circuit 151 corresponds to a second storage means. The corrected exponent calculation circuit 152 corresponds to a first calculating means. Shift circuits SC21-SC23 corresponds to first shifting means, respectively.

The exponent memory circuit 151 holds the maximum exponent Imax outputted by the maximum exponent calculation circuit 121 in each cycle, in an address designated from the outside. The exponent memory circuit 151 outputs the maximum exponents Imax(s) which are held in addresses designated from the outside, as exponent data ID1-ID3.

The corrected exponent calculation circuit 152 calculates corrected exponents CI1-CI3 based on the exponent data ID1-ID3. The calculated corrected exponents CI1-CI3 are outputted to the shift circuits SC21-SC23, respectively.

The shift circuits SC21-SC23 receive the data D141-D143 from the data memory circuit 140. The shift circuits SC21-SC23 carry out shift operation on the data D141-D143, respectively, based on the corrected exponents CI1-CI3. As a result, the second normalization processing is performed for the data D141-D143. The shift circuits SC21-SC23 output the data after the second normalization processing as data D151-D153.

Next, operation of the arithmetic processing apparatus 100 will be explained in detail. The operation of the arithmetic processing apparatus 100 includes cycles C1-C6. The operation of the arithmetic processing apparatus 100 is broadly divided into cycles C1-C3 and cycles C4-C6. In below, in the view of the operation of the arithmetic processing apparatus 100, the cycles C1-C3 and the cycles C4-C6 will be described as a first normalization phase P1 and a second normalization phase P2, respectively. The progress of the cycle is controlled using a clock signal CLK, for example.

Figure 3:
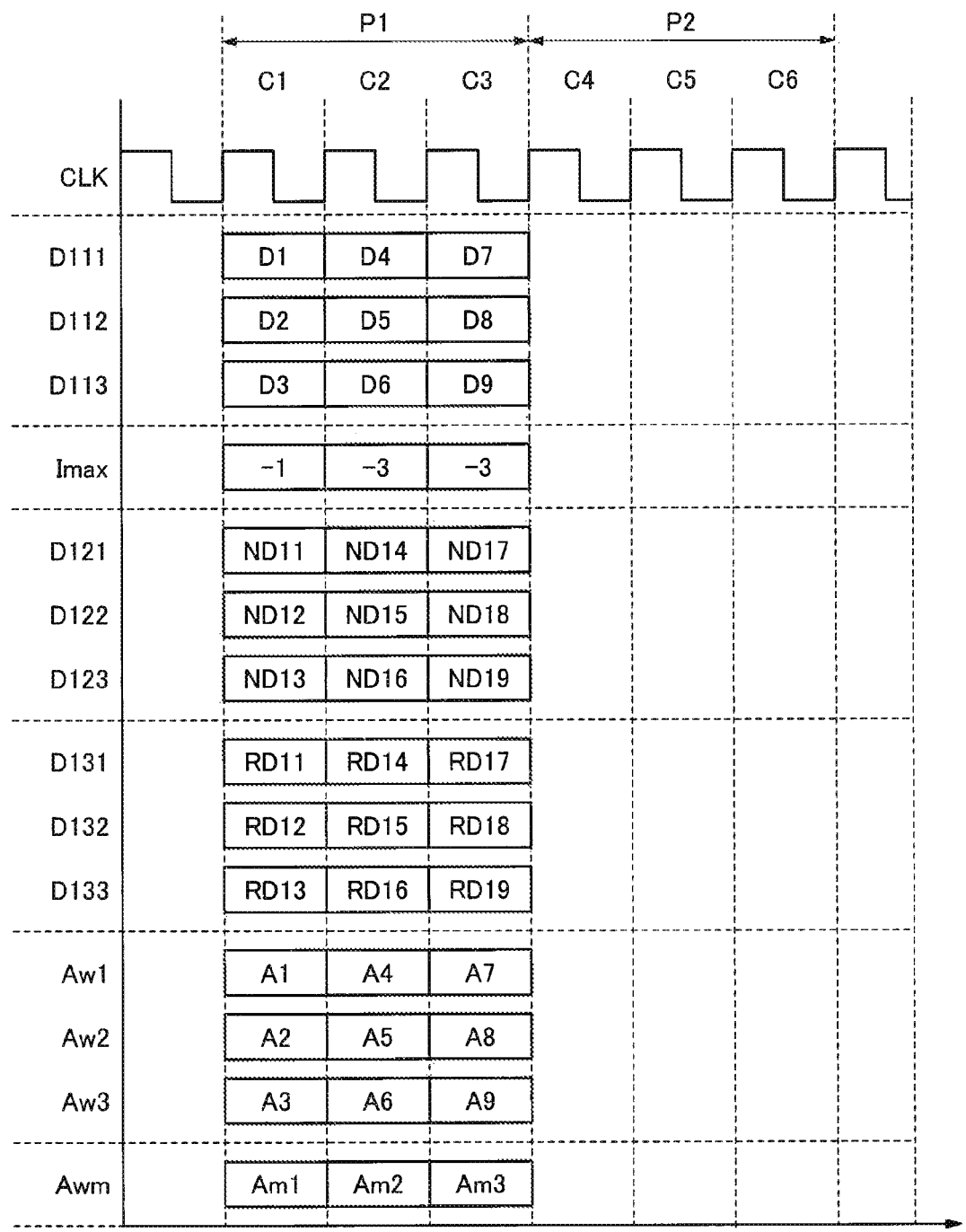
FIG. 3 is a timing chart showing operation in a first normalization phase (cycles C1-C3) of the arithmetic processing apparatus 100 according to the exemplary embodiment 1.

First, the operation of the arithmetic processing apparatus 100 in the first normalization phase P1 (cycles C1-C3) will be described. FIG. 3 is a timing chart showing the operation in the first normalization phase P1 (cycles C1-C3) of the arithmetic processing apparatus 100 according to the exemplary embodiment 1.

In this exemplary embodiment, the first arithmetic circuit 110 outputs data D1-D9, each having 12 bits, as a block to be processed by normalization of a block floating point. In below, values of the data D1-D9 are represented with two's complement representation. In a bit string of data indicated below, the leftmost bit is MSB (Most Significant Bit), and the rightmost bit is LSB (Least Significant Bit). Note that, the MSB is a sign bit. The data D1-D9 are shown below.

Data D1: 000101110111
Data D2: 001100010001
Data D3: 000001101100
Data D4: 111100111000
Data D5: 111110000000
Data D6: 000000100101
Data D7: 000010111110
Data D8: 000011010001
Data D9: 000010111001

In the cycle C1, the first arithmetic circuit 110 carries out an arithmetic operation for inputted data, and outputs the data D1-D3 which are arithmetic operation results as the data D111-D113, respectively. Similarly, in the cycle C2, the first arithmetic circuit 110 carries out the arithmetic operation for inputted data, and outputs the data D4-D6 which are arithmetic operation results as the data D111-D113, respectively. In the cycle C3, the first arithmetic circuit 110 carries out the arithmetic operation for inputted data, and outputs the data D7-D9 which are arithmetic operation results as the data D111-D113, respectively.

In the cycles C1-C3, the maximum exponent calculation circuit 121 receives the data D111-D113, in each cycle. The maximum exponent calculation circuit 121 calculates a maximum exponent Imax for the data D111-D113, in each cycle.

Specifically, the maximum exponent calculation circuit 121 calculates absolute values of the data D1-D9 in the block, in each cycle. The absolute values ABS1-ABS9 of the data D1-D9 are shown below.

(Cycle C1)
Absolute value ABS1 (absolute value of data D1): 000101110111
Absolute value ABS2 (absolute value of data D2): 001100010001
Absolute value ABS3 (absolute value of data D3): 000001101100
(Cycle C2)
Absolute value ABS4 (absolute value of data D4): 000011001000
Absolute value ABS5 (absolute value of data D5): 000010000000
Absolute value ABS6 (absolute value of data D6): 000000100101
(Cycle C3)
Absolute value ABS7 (absolute value of data D7): 000010111110
Absolute value ABS8 (absolute value of data D8): 000011010001
Absolute value ABS9 (absolute value of data D9): 000010111001

Next, in each cycle, the logical sums ADD1-3 of the calculated absolute values ABS1-ABS9 are calculated. The respective logical sums ADD1-3 of the absolute values ABS1-ABS3, the absolute values ABS4-ABS6 and the absolute values ABS7-ABS9 are shown below.

(Cycle C1)
Logical sum ADD1 (logical sum of absolute values ABS1-ABS3): 001101111111
(Cycle C2)
Logical sum ADD2 (logical sum of absolute values ABS4-ABS6): 000011101101
(Cycle C3)
Logical sum ADD3 (logical sum of absolute values ABS7-ABS9): 000011111101

Next, in the respective cycles, the first bit position indicating one as a value of the bit from the MSB (Most Significant Bit) side of the logical sum is detected. In below, it is assumed that the MSB is 11-th bit and, the LSB (Least Significant Bit) is 0-th bit.

First, in the cycle C1, the 9-th bit is detected as the first bit position indicating one as a value of the bit from the MSB side. Here, the case that bit shift operation of shifting left is carried out on each of the data D1-D3 with a same shift size to normalize the data D1-D3 with a common exponent is considered. In this case, when the shifting size is 1 bit, values after the normalization are correctly represented without changing a sign of any of the data D1-D3. Accordingly, the maximum exponent Imax1 of the cycle C1 is "−1". In the cycle C1, the maximum exponent calculation circuit 121 outputs "−1" as the calculated maximum exponent Imax1.

Similarly, in the cycle C2, the 7-th bit is detected as the first bit position indicating one as a value of the bit from the MSB side. In the case that the bit shift operation of shifting left is carried out on each of the data D4-D6 with a same shift size to normalize the data D4-D6 with a common exponent, values after the normalization are correctly represented without changing a sign of any of the data D4-D6, if the shifting size is 3 bits. Accordingly, the maximum exponent Imax2 of the cycle C2 is "−3". In the cycle C2, the maximum exponent calculation circuit 121 outputs "−3" as the calculated maximum exponent Imax2.

In a cycle C3, the 7-th bit is detected as the first bit position indicating one as a value of the bit from the MSB side. In the case that the bit shift operation of shifting left is carried out on each of the data D7-D9 with a same shift size to normalize the data D7-D9 with a common exponent, values after the normalization are correctly represented without changing a sign of any of the data D7-D9, if the shifting size is 3 bits. Accordingly, the maximum exponent Imax3 of the cycle C3 is "−3". In the cycle C3, the maximum exponent calculation circuit 121 outputs "−3" as the calculated maximum exponent Imax3.

In the cycle C1, the exponent memory circuit 151 writes the value "−1" of the maximum exponent Imax1 in an address Am1 designated by a write address Awm. In the cycle C2, the exponent memory circuit 151 writes the value "−3" of the maximum exponent Imax2 in an address Am2 designated by a write address Awm. In the cycle C3, the exponent memory circuit 151 writes the value "−3" of the maximum exponent Imax3 in an address Am3 designated by a write address Awm.

Next, operation of the shift circuits SC11-SC13 will be described. The shift circuits SC11-SC13 perform the first normalization processing by carrying out shift operation on the data D111-D113, based on the maximum exponent Imax calculated by the maximum exponent calculation circuit 121, in each cycle.

Specifically, in the cycle C1, the shift circuits SC11-SC13 carry out shift operation on the data D1-D3 received as the data D111-D113, based on the value "−1" of the maximum exponent Imax1 calculated by the maximum exponent calculation circuit 121, respectively. The shift circuits SC11-SC13 output first normalized data ND11-ND13 after the first normalization processing as data D121-D123, respectively.

In the cycle C2, the shift circuits SC11-SC13 carry out shift operation on the data D4-D6 received as the data D111-D113, based on the value "−3" of the maximum exponent Imax2 calculated by the maximum exponent calculation circuit 121, respectively. The shift circuits SC11-SC13 output first normalized data ND14-ND16 after the first normalization processing as the data D121-D123, respectively.

In a cycle C3, the shift circuits SC11-SC13 carry out shift operation on the data D7-D9 received as data D111-D113, based on the value "−3" of the maximum exponent Imax3 calculated by the maximum exponent calculation circuit 121, respectively. The shift circuit SC11-SC13 output first normalized data ND17-ND19 after the first normalization processing as the data D121-D123, respectively.

The first normalized data ND11-ND19 after the first normalization processing in each cycle of the first normalization phase P1 (cycles C1-C3) is shown below.

(Cycle C1)
First normalized data ND11: 001011101110
First normalized data ND12: 011000100010
First normalized data ND13: 000011011000
(Cycle C2)
First normalized data ND14: 100111000000
First normalized data ND15: 110000000000
First normalized data ND16: 000100101000
(Cycle C3)
First normalized data ND17: 010111110000
First normalized data ND18: 011010001000
First normalized data ND19: 010111001000

In the cycle C1-C3, the rounding circuits 131-133 perform the rounding processing to the first normalized data ND11-ND19 outputted as the data D121-D123, respectively. As a result, the rounding circuits 131-133 generate rounded data RD11-RD19 each having a bit width of 6 bits, reduced from the normalized data ND1-ND9.

In other words, in the cycle C1, the rounding circuits 131-133 output the rounded data RD11-RD13 each having a bit width reduced from the first normalized data ND11-ND13, as rounded data D131-D133, respectively.

In the cycle C2, the rounding circuits 131-133 output the rounded data RD14-RD16 each having a bit width reduced from the first normalized data ND14-ND16, as the rounded data D131-D133, respectively.

In the cycle C3, the rounding circuits 131-133 output the rounded data RD17-RD19 each having a bit width reduced from the first normalized data ND17-ND19, as the rounded data D131-D133, respectively.

The rounded data RD11-RD19 after the rounding processing in each cycle of the first normalization phase P1 (cycles C1-C3) are shown below.

(Cycle C1)
Rounded data RD11: 001011
Rounded data RD12: 011000
Rounded data RD13: 000011
(Cycle C2)
Rounded data RD14: 100111
Rounded data RD15: 110000
Rounded data RD16: 000100
(Cycle C3)
Rounded data RD17: 010111
Rounded data RD18: 011010
Rounded data RD19: 010111

The data memory circuit 140 receives and holds the rounded data RD11-RD19 outputted by the rounding circuits 131-133 as the data D131-D133, in the first normalization phase P1 (cycles C1-C3).

Specifically, in the cycle C1, the data memory circuit 140 stores and holds the rounded data RD11-RD13, outputted as the data D131-D133, to addresses A1-A3 designated by write address Aw1-Aw3, respectively.

In the cycle C2, the data memory circuit 140 stores and holds the rounded data RD14-RD16, outputted as the data D131-D133, to addresses A1-A3 designated by the write address Aw1-Aw3, respectively.

In the cycle C3, the data memory circuit 140 stores and holds the rounded data RD17-RD19, outputted as the data D131-D133, to addresses A1-A3 designated by the write address Aw1-Aw3, respectively.

The exponent memory circuit 151 stores and holds the maximum exponents Imax1-Imax3 calculated in each of the cycles C1-C3.

Specifically, in the cycle C1, the exponent memory circuit 151 stores and holds the value "−1" of the maximum exponent Imax1 in address Am1 designated by write address Awm. Similarly, in the cycle C2, the exponent memory circuit 151 stores and holds the value "−3" of the maximum exponent Imax2 in address Am2 designated by the write address Awm. In the cycle C3, the exponent memory circuit 151 stores and holds the value "−3" of the maximum exponent Imax3 in address Am3 designated by the write address Awm.

Figure 4:
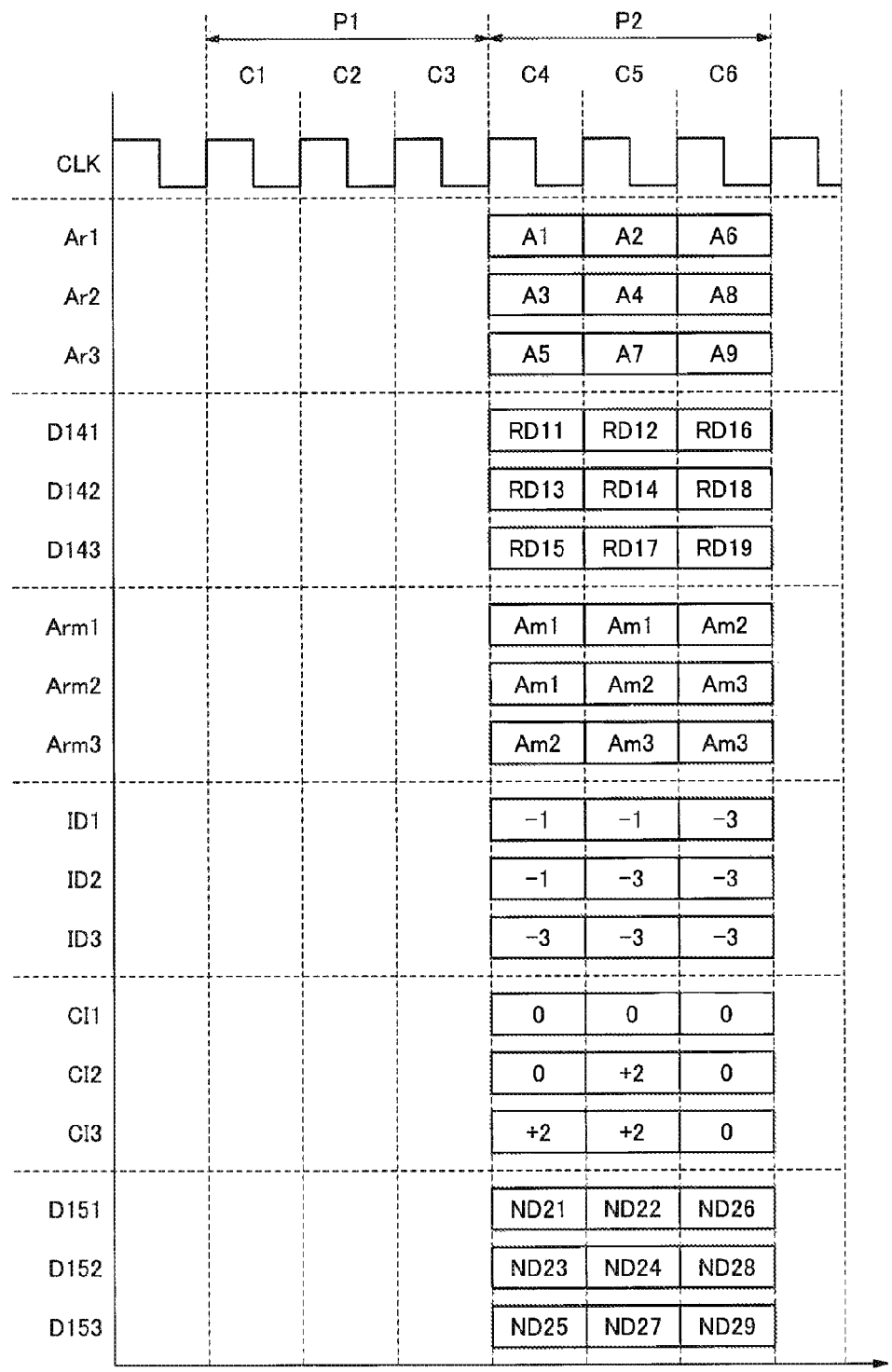
FIG. 4 is a timing chart showing operation in a second normalization phase (cycles C4-C6) of the arithmetic processing apparatus 100 according to the exemplary embodiment 1.
Figure 5:
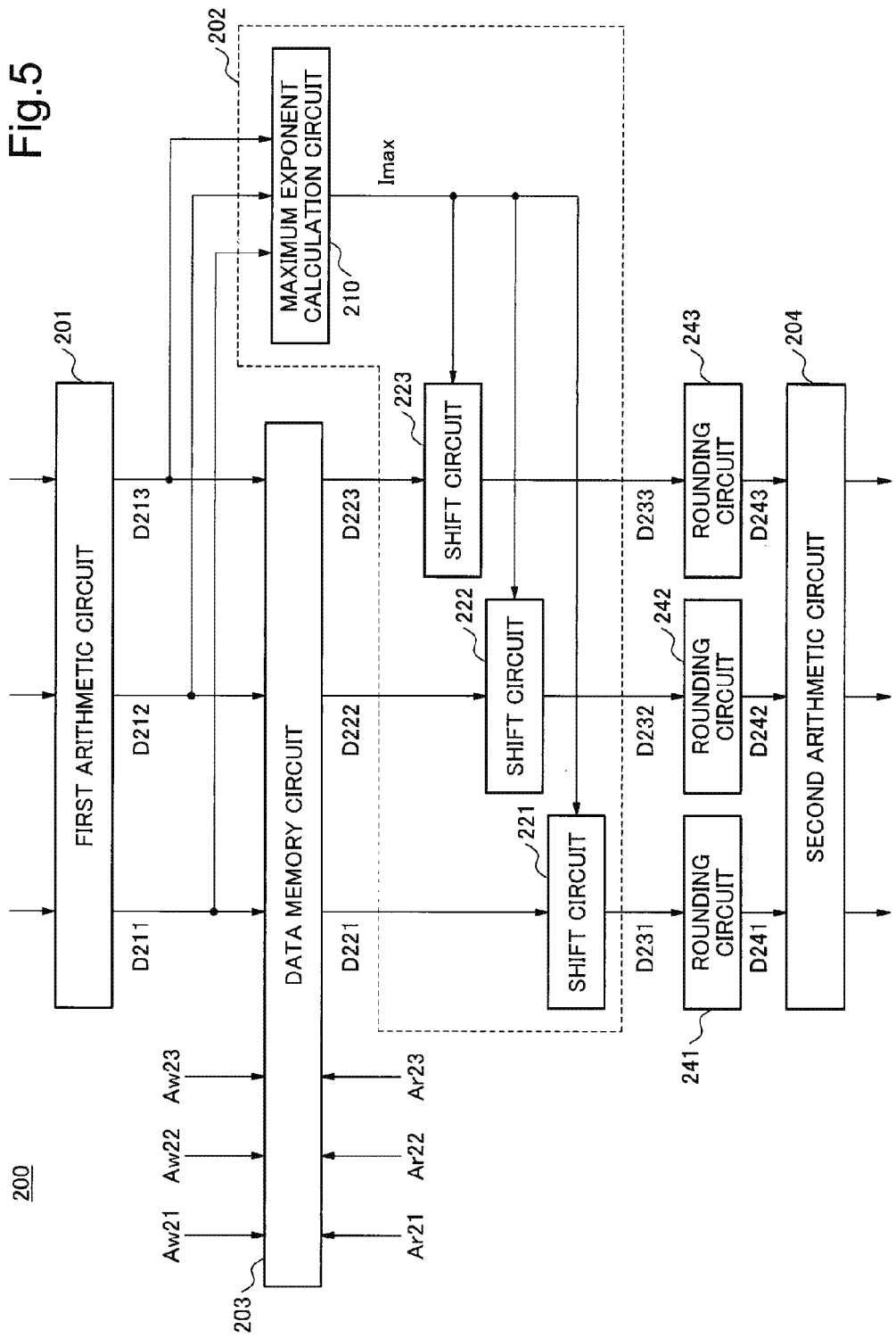
FIG. 5 is a block diagram showing a configuration of a usual arithmetic processing apparatus 200 which performs normalization processing of a block floating point.
Figure 6:
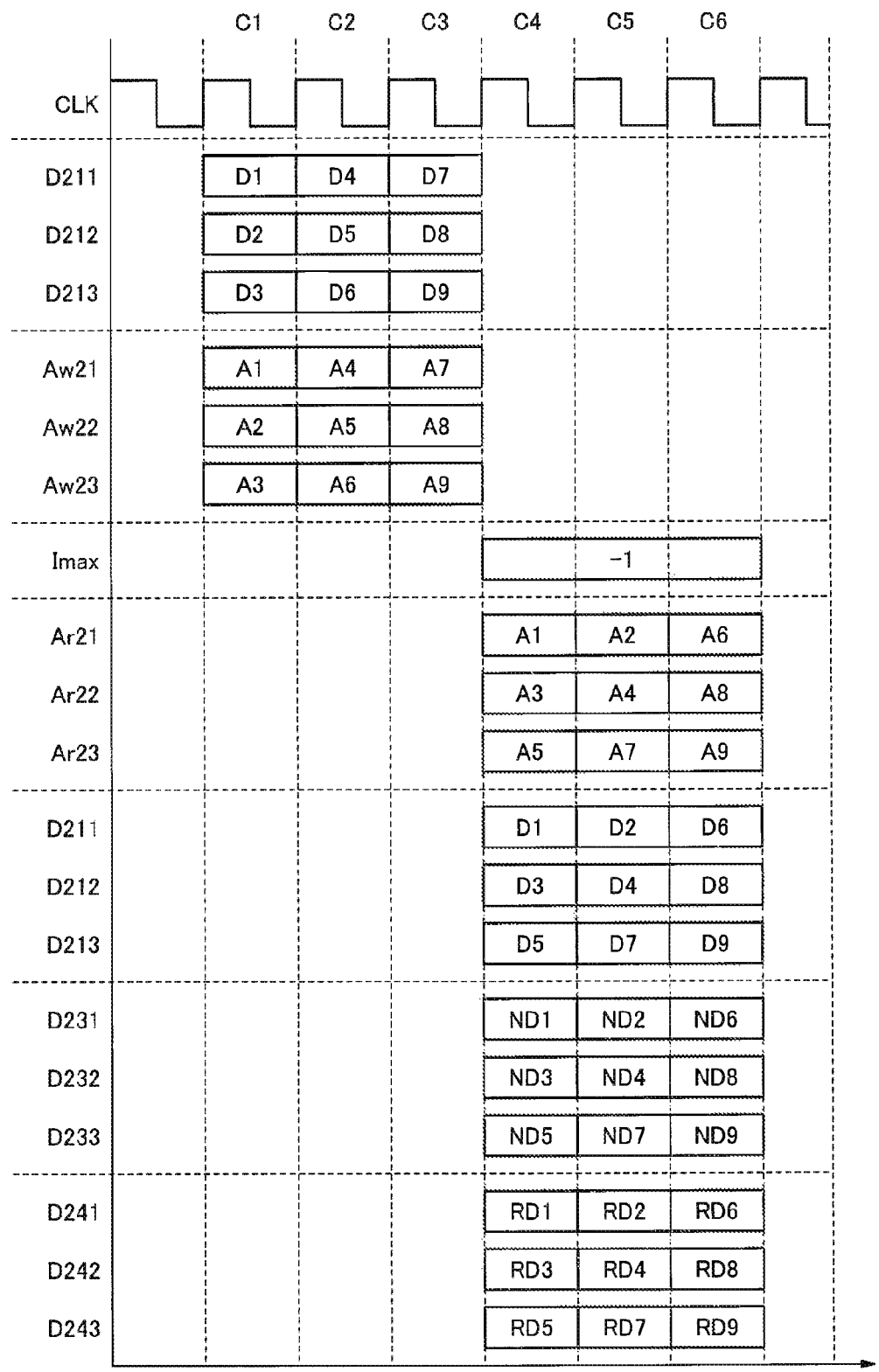
FIG. 6 is a timing chart showing operation of the arithmetic processing apparatus 200.

Next, the operation of the arithmetic processing apparatus 100 in the second normalization phase P2 (cycles C4-C6) will be described. FIG. 4 is a timing chart showing the operation in the second normalization phase P2 (cycles C4-C6) of the arithmetic processing apparatus 100 according to the exemplary embodiment 1.

The data memory circuit 140 outputs the held rounded data RD11-RD19 as data D141-D143. At that time, the data memory circuit 140 outputs pieces of data in the different order from the input, for the arithmetic operation performed by the second arithmetic circuit 160.

Specifically, in the cycle C4, the data memory circuit 140 outputs the rounded data RD11 held in the address A1 designated by readout address Ar1 as the data D141. Similarly, the data memory circuit 140 outputs the rounded data RD13 held in the address A3 designated by readout address Ar2 as the data D142 and outputs the rounded data RD15 held in the address A5 designated by readout address Ar3 as the data D143.

In the cycle C5, the data memory circuit 140 outputs the rounded data RD12 held in the address A2 designated by the readout address Ar1 as the data D141. Similarly, the data memory circuit 140 outputs the rounded data RD14 held in the address A4 designated by the readout address Ar2 as the data D142 and outputs the rounded data RD17 held in the address A7 designated by the readout address Ar3 as the data D143.

In the cycle C6, the data memory circuit 140 outputs the rounded data RD16 held in the address A6 designated by the readout address Ar1 as the data D141. Similarly, the data memory circuit 140 outputs the rounded data RD18 held in the address A8 designated by the readout address Ar2 as the data D142 and outputs the rounded data RD19 held in the address A9 designated by the readout address Ar3 as the data D143.

In the second normalization phase P2 (cycles C4-C6), the exponent memory circuit 151 outputs the held maximum exponents Imax1-Imax3 as exponent data ID1-ID3.

Specifically, in the cycle C4, the exponent memory circuit 151 outputs the value "−1" of the maximum exponent Imax1 held in the address Am1 designated by readout address Arm1 as the data ID1. Similarly, the exponent memory circuit 151 outputs the value "−1" of the maximum exponent Imax1 held in the address Am1 designated by readout address Arm2 as the exponent data ID2 and outputs the value "−3" of the maximum exponent Imax3 held in the address Am2 designated by readout address Arm3 as the exponent data ID3.

In the cycle C5, the exponent memory circuit 151 outputs the value "−1" of the maximum exponent Imax1 held in the address Am1 designated by the readout address Arm1 as the data ID1. Similarly, the exponent memory circuit 151 outputs the value "−3" of the maximum exponent Imax2 held in the address Am2 designated by the readout address Arm2 as the exponent data ID2 and outputs the value "−3" of the maximum exponent Imax3 held in the address Am3 designated by the readout address Arm3 as the exponent data ID3.

In a cycle C6, the exponent memory circuit 151 outputs the value "−3" of the maximum exponent Imax2 held in the address Am2 designated by the readout address Arm1 as the data ID1. Similarly, the exponent memory circuit 151 outputs the value "−3" of the maximum exponent Imax3 held in the address Am3 designated by the readout address Arm2 as the exponent data ID2 and outputs the value "−3" of the maximum exponent Imax3 held in the address Am3 designated by the readout address Arm3 as the exponent data ID3.

In each cycle of the second normalization phase P2 (cycles C4-C6), the corrected exponent calculation circuit 152 calculates corrected exponents CI1-CI3 based on the exponent data ID1-ID3. The corrected exponent calculation circuit 152 outputs the corrected exponents CI1-CI3 to the shift circuits SC21-SC23, respectively.

First, in the cycle C4, the corrected exponent calculation circuit 152 calculates the corrected exponents CI1-CI3 from the values "−1", "−1" and "−3" of the exponent data ID1-ID3, respectively. Specifically, the corrected exponent calculation circuit 152 finds the maximum value of the inputted exponent data ID1-ID3. In this case, the maximum value for the exponent data ID1-ID3 is the value "−1" of the exponent data ID1. The corrected exponent calculation circuit 152 calculates the corrected exponents CI1-CI3 of the exponent data ID1-ID3. Here, the corrected exponents CI1-CI3 are numbers wherein each of values obtained by adding the numbers to exponent data ID1-ID3 respectively is equal to the maximum value. Accordingly, the corrected exponent calculation circuit 152 outputs "0", "0" and "+2", respectively, as the corrected exponents CI1-CI3.

In the cycle C5, the corrected exponent calculation circuit 152 calculates the corrected exponents CI1-CI3 from the values "−1", "−3" and "−3" of exponent data ID1-ID3, respectively. In this case, the maximum value for the exponent data ID1-ID3 is the value "−1" of the exponent data ID1. Accordingly, the corrected exponent calculation circuit 152 outputs "0", "+2" and "+2", respectively, as the corrected exponents CI1-CI3.

In the cycle C6, the corrected exponent calculation circuit 152 calculates the corrected exponents CI1-CI3 from the values "−3", "−3" and "−3" of the exponent data ID1-ID3. In this case, the maximum value for the exponent data ID1-ID3 is the value "−3" of the exponent data ID1. Accordingly, the corrected exponent calculation circuit 152 outputs "0" respectively, as the corrected exponents CI1-CI3.

In the second normalization phase P2 (cycles C4-C6), the shift circuits SC21-SC23 perform the second normalization processing by carrying out shift operation on the data D141-D143, based on the corrected exponents CI1-CI3 calculated by the corrected exponent calculation circuit 152, respectively. Data D151-D153 generated by the second normalization processing are outputted to the second arithmetic circuit 160. Note that, by the second normalization processing, second normalized data ND21-ND29 are generated based on the rounded data RD11-RD19.

Specifically, in the cycle C4, the shift circuit SC21 generates the second normalized data ND21 by shifting the rounded data RD11 received as the data D141 by "0", which is the value of the corrected exponent CI1. The shift circuit SC22 generates the second normalized data ND23 by shifting the rounded data RD13 received as the data D142 by "0", which is the value of the corrected exponent CI2. The shift circuit SC23 generates the second normalized data ND25 by shifting the rounded data RD15 received as the data D143 by "+2", which is the value of the corrected exponent CI3. The second normalized data ND21, ND23 and ND25 are outputted as data D151-D153, respectively.

In the cycle C5, the shift circuit SC21 generates the second normalized data ND22 by shifting the rounded data RD12 received as the data D141 by "0", which is the value of the corrected exponent CI1. The shift circuit SC22 generates the second normalized data ND24 by shifting the rounded data RD14 received as the data D142 by "+2", which is the value of the corrected exponent CI2. The shift circuit SC23 generates the second normalized data ND27 by shifting the rounded data RD17 received as the data D143 by "+2", which is the value of the corrected exponent CI3. The second normalized data ND22, ND24 and ND27 are outputted as the data D151-D153, respectively.

In the cycle C6, the shift circuit SC21 generates the second normalized data ND26 by shifting the rounded data RD16 received as the data D141 by "0", which is the value of the corrected exponent CI1. The shift circuit SC22 generates the second normalized data ND28 by shifting the rounded data RD18 received as the data D142 by "0", which is the value of the corrected exponent CI2. The shift circuit SC23 generates the second normalized data ND29 by shifting the rounded data RD19 received as the data D143 by "0", which is the value of the corrected exponent CI3. The second normalized data ND26, ND28 and ND29 are outputted as the data D151-D153, respectively.

The second normalized data ND21-ND29 after the second normalization processing in each cycle of the second normalization phase P2 (cycles C4-C6) are shown below.

(Cycle C4)
Second normalized data ND21: 001011
Second normalized data ND23: 000011
Second normalized data ND25: 111100
(Cycle C5)
Second normalized data ND22: 011000
Second normalized data ND24: 111001
Second normalized data ND27: 000101
(Cycle C6)
Second normalized data ND26: 000100
Second normalized data ND28: 011010
Second normalized data ND29: 010111

Next, a characteristic configuration of the present invention will be described.

Figure 7:
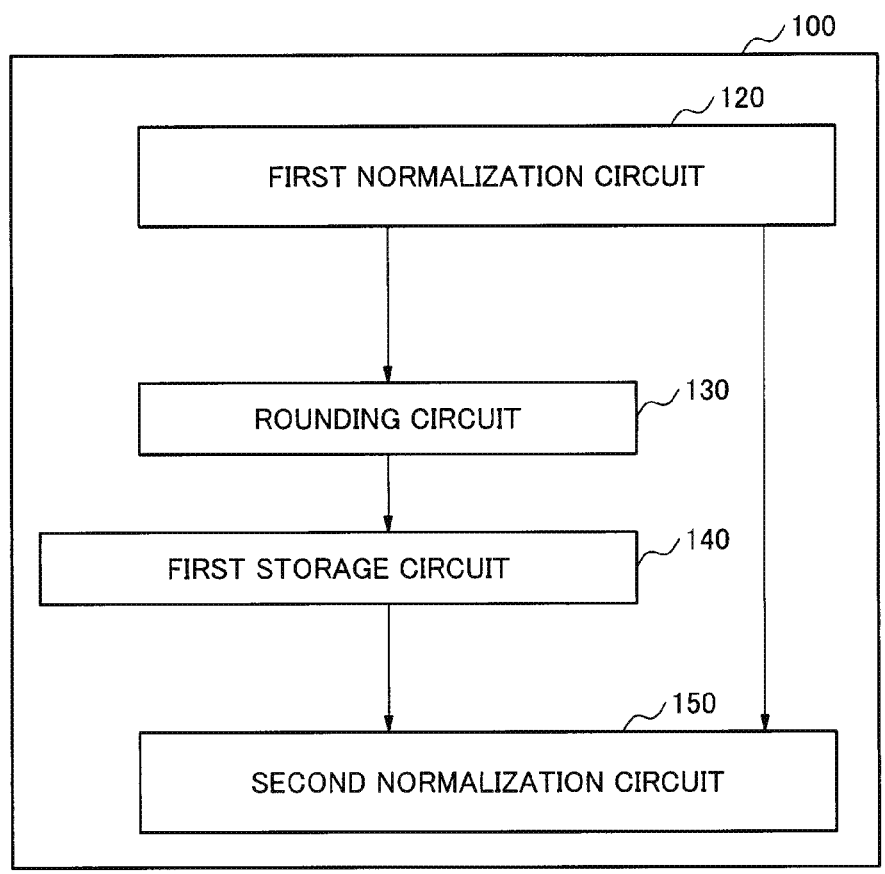
FIG. 7 is a block diagram showing a characteristic configuration of the exemplary embodiment 1.

FIG. 7 is a block diagram showing a characteristic configuration of the exemplary embodiment 1.

An arithmetic processing apparatus 100 includes a first normalization circuit 120, a rounding circuit 130, a data memory circuit (first storage circuit) 140, and a second normalization circuit 150.

The first normalization circuit 120 performs a first normalization, in which a plurality pieces of data, which have a common exponent and which are either fixed-point number representation data or mantissa portion data of block floating-point number representation, are inputted in each of a plurality of cycles and the plurality of pieces of data inputted in each of the plurality of cycles are respectively normalized with the common exponent on the basis of a maximum exponent for the plurality of pieces of data inputted in a corresponding one of the plurality of cycle.

The rounding circuit 130 outputs a plurality of pieces of rounded data which are obtained by reducing a bit width of respective one of the plurality of pieces of data on which the first normalization is performed.

The data memory circuit (first storage circuit) 140 stores a plurality of pieces of rounded data regarding the plurality of cycles in which the first normalization is performed and outputs a plurality of designated pieces of rounded data among the stored plurality of pieces of rounded data.

The second normalization circuit 150 performs a second normalization, in which the plurality of designated pieces of rounded data are respectively normalized with an exponent which is common to the plurality of designated pieces of rounded data on the basis of the maximum exponents used in the first normalization for the plurality of designated pieces of rounded data and a maximum value of the maximum exponents, and outputs a result of the second normalization.

As mentioned above, according to the exemplary embodiment, in a data processing circuit which includes a plurality of parallel arithmetic circuits and carries out arithmetic operation on a plurality of pieces of data in parallel, block floating point processing is performed bundling pieces of data to be calculated simultaneously in the respective arithmetic circuits into one block. Therefore, without depending on the size of the data to be processed, the block size can be decided according to the paralleling degree of the arithmetic operation. Accordingly, because the block can be small even when the size of the data to be processed is large, there is an effect that a precision is not reduced even when a range of values of respective pieces of data is wide.

In the arithmetic processing apparatus 100, it is possible to perform the first normalization processing and the rounding processing at the former stage of the data memory circuit 140 which holds the data, and perform the second normalization processing at the latter stage of the data memory circuit 140.

In addition, based on the exponent values in the first normalization processing, the corrected exponents for the second normalization processing are determined. That is, in the arithmetic processing apparatus 100, the corrected exponents are calculated in such a way that the cycles in which the rounded data RD11-RD19, which are base of the data D141-D143 on which the second normalization processing is performed by the shift circuit SC21-SC23, are generated and the cycles in which the maximum exponents, which are used in a subtraction for calculating the corrected exponents for normalizing the rounded data RD11-RD19, are calculated are the same, respectively.

Accordingly, in the arithmetic processing apparatus 100, because the bits of the data are reduced by the rounding processing in front of the data memory circuit 140, the memory capacity required for the data memory circuit 140 can be reduced. As a result, the arithmetic processing apparatus with the small circuit size and the low power consumption can be provided.

Note that, the present invention is not limited to the embodiment mentioned above, and it can be changed appropriately without departing from the spirit. For example, in the exemplary embodiment mentioned above, although 3 is used as the values of n and m, it is only an example. Accordingly, any integer equal to or greater than 2 can be used as n and m.

In addition, in the exemplary embodiment mentioned above, the combination of pieces of data outputted from the data memory circuit 140 in each cycle is not limited to the example mentioned above. That is, as long as it is outputted by n pieces, the data memory circuit 140 can output any combination of pieces of data.

This application is based upon and claims the benefit of priority from Japanese Patent Application No. 2011-109554, filed on May 16, 2011, the disclosure of which is incorporated herein in its entirety by reference.

REFERENCE SIGNS LIST 100 arithmetic processing apparatus
110, 201 first arithmetic circuit
120 first normalization circuit
130 rounding circuit
131 first rounding circuit
132 second rounding circuit
133 third rounding circuit
140, 203 data memory circuit
150 second normalization circuit
160, 204 second arithmetic circuit
121, 210 maximum exponent calculation circuit
151 exponent memory circuit
152 corrected exponent calculation circuit
241-243 rounding circuit
200 arithmetic processing apparatus
202 normalization circuit
221-223 shift circuit
Aw1-Aw3, Aw21-Aw23, Awm write address
Ar1-Ar3, Ar21-Ar23, Arm1-Arm3 readout address C1-C6 cycle
CI1-CI3 corrected exponent
D1-D9, D111-D113, D121-D123, D131-D133, D141-D143, D151-D153, D211-D213, D221-D223, D231-D233, D241-D243 data
ID1-ID3 exponent data
Imax, Imax1-Imax3 maximum exponent P1 first normalization phase
P2 second normalization phase
SC11-SC13, SC21-SC23 shift circuit

What is claimed is:

1. An arithmetic processing apparatus comprising:

a first normalization circuit which performs a first normalization, in which a plurality pieces of data, which are either fixed-point number representation data or mantissa portion data of block floating-point number representation, are inputted in each cycle and the plurality of pieces of data inputted in the cycle are respectively normalized on the basis of a maximum exponent for the plurality of pieces of data inputted in the cycle;

a rounding circuit which outputs a plurality of pieces of rounded data which are obtained by reducing a bit width of respective one of the plurality of pieces of data on which the first normalization is performed;

a first storage circuit which stores a plurality of pieces of rounded data regarding a plurality of cycles in which the first normalization is performed and outputs a plurality of designated pieces of rounded data among the stored plurality of pieces of rounded data, the plurality of designated pieces of rounded data including pieces of rounded data outputted in different cycles; and a second normalization circuit which performs a second normalization, in which the plurality of designated pieces of rounded data are respectively normalized on the basis of the maximum exponents used in the first normalization for the plurality of designated pieces of rounded data and a maximum value of the maximum exponents, and outputs a result of the second normalization, wherein the second normalization circuit calculates, for each of the plurality of designated pieces of rounded data, a corrected exponent which is obtained by subtracting the maximum exponent used in the first normalization for a corresponding one of the plurality of designated pieces of rounded data from the maximum value of the maximum exponents used in the first normalization for the plurality of designated pieces of rounded data, and normalizes the plurality of designated pieces of rounded data based on the corrected exponents respectively, wherein n (n is an integer which is equal to or greater than 2) pieces of the fixed-point number representation data or the mantissa portion data of block floating-point number representation are inputted in each cycle, in a first normalization phase, the first normalization circuit normalizes n pieces of data on the basis of the maximum exponent for the n pieces of data, in each cycle, the rounding circuit outputs n pieces of rounded data which are obtained by reducing a bit width of respective one of the n pieces of data on which the first normalization is performed, in each cycle, the first storage circuit stores (m×n) pieces of rounded data for m (m is an integer which is equal to or greater than 2) cycles in the first normalization phase, and outputs n designated pieces of rounded data which are selected from the stored rounded data, in each cycle, in a second normalization phase after the first normalization phase, the second normalization circuit selects n maximum exponents for cycles respectively corresponding to the n designated pieces of rounded data out of m maximum exponents for the m cycles, calculates n corrected exponents by subtracting respective one of the n maximum exponents from the maximum value of the n maximum exponents, and normalizes the n pieces of designated rounded data based on the n corrected exponents respectively, in each cycle, in the second normalization phase, a cycle in which k-th (k is an integer which is equal to or greater than 1 and equal to or smaller than n) piece of rounded data in the normalization by the second normalization circuit is generated and a cycle corresponding to the maximum exponent used to calculate the corrected exponent in the normalization of the k-th rounded data by the second normalization circuit are the same.

2. The arithmetic processing apparatus according to claim 1, wherein the second normalization circuit includes:

a second storage circuit which stores each of the m maximum exponents in an addresses designated as a write address from the outside, and outputs the n maximum exponents stored in n addresses designated as exponent read-out addresses from the outside in each cycle in the second normalization phase; and a first calculating circuit which detects the maximum value of the n maximum exponents outputted from the second storage circuit, and calculates the n corrected exponents by subtracting respective one of the n maximum exponents from the detected maximum value, in each cycle.

3. The arithmetic processing apparatus according to claim 1, wherein the first storage circuit stores respective one of the (m×n) pieces of rounded data in an address designated as a write address from the outside in the first normalization phase, and outputs n pieces of rounded data stored in addresses designated as readout addresses from the outside in each cycle in the second normalization phase.

4. The arithmetic processing apparatus according to claim 1, wherein the second normalization circuit further includes n first shifting circuit which stores a bit of n designated pieces of rounded data based on the n corrected exponents respectively, in each cycle.

5. The arithmetic processing apparatus according to claim 1, wherein the first normalization circuit includes:

a second calculating circuit which calculates n exponents for normalizing received the n pieces of data in each cycle, and outputs the maximum value of the n exponents as the maximum exponent, and n second shifting circuits which shift a bit of the n pieces of data based on the maximum exponent respectively, in each cycle.

6. The arithmetic processing apparatus according to claim 1, wherein the rounding circuit includes n rounding circuits which reduce a bit width of respective one of the n pieces of data normalized by the first normalization circuit, in each cycle.

7. An arithmetic processing apparatus comprising:

a first normalization means for performing a first normalization, in which a plurality pieces of data, which are either fixed-point number representation data or mantissa portion data of block floating-point number representation, are inputted in each cycle and the plurality of pieces of data inputted in the cycle are respectively normalized on the basis of a maximum exponent for the plurality of pieces of data inputted in the cycle;

a rounding means for outputting a plurality of pieces of rounded data which are obtained by reducing a bit width of respective one of the plurality of pieces of data on which the first normalization is performed;

a first storage means for storing a plurality of pieces of rounded data regarding a plurality of cycles in which the first normalization is performed and outputting a plurality of designated pieces of rounded data among the stored plurality of pieces of rounded data, the plurality of designated pieces of rounded data including pieces of rounded data outputted in different cycles; and a second normalization means for performing a second normalization, in which the plurality of designated pieces of rounded data are respectively normalized on the basis of the maximum exponents used in the first normalization for the plurality of designated pieces of rounded data and a maximum value of the maximum exponents, and outputting a result of the second normalization, wherein the second normalization means calculates, for each of the plurality of designated pieces of rounded data, a corrected exponent which is obtained by subtracting the maximum exponent used in the first normalization for a corresponding one of the plurality of designated pieces of rounded data from the maximum value of the maximum exponents used in the first normalization for the plurality of designated pieces of rounded data, and normalizes the plurality of designated pieces of rounded data based on the corrected exponents respectively, wherein n (n is an integer which is equal to or greater than 2) pieces of the fixed-point number representation data or the mantissa portion data of block floating-point number representation are inputted in each cycle, in a first normalization phase, the first normalization means normalizes n pieces of data on the basis of the maximum exponent for the n pieces of data, in each cycle, the rounding means outputs n pieces of rounded data which are obtained by reducing a bit width of respective one of the n pieces of data on which the first normalization is performed, in each cycle, the first storage means stores (m×n) pieces of rounded data for m (m is an integer which is equal to or greater than 2) cycles in the first normalization phase, and outputs n designated pieces of rounded data which are selected from the stored rounded data, in each cycle, in a second normalization phase after the first normalization phase, the second normalization means selects n maximum exponents for cycles respectively corresponding to the n designated pieces of rounded data out of m maximum exponents for the m cycles, calculates n corrected exponents by subtracting respective one of the n maximum exponents from the maximum value of the n maximum exponents, and normalizes the n pieces of designated rounded data based on the n corrected exponents respectively, in each cycle, in the second normalization phase, a cycle in which k-th (k is an integer which is equal to or greater than 1 and equal to or smaller than n) piece of rounded data in the normalization by the second normalization means is generated and a cycle corresponding to the maximum exponent used to calculate the corrected exponent in the normalization of the k-th rounded data by the second normalization means are the same.

\* \* \* \* \*